Nov. 8, 1932.   H. C. OSBORN   1,887,184
RIBBON SPOOL FOR PRINTING MACHINES
Filed Nov. 14, 1929   2 Sheets-Sheet 2
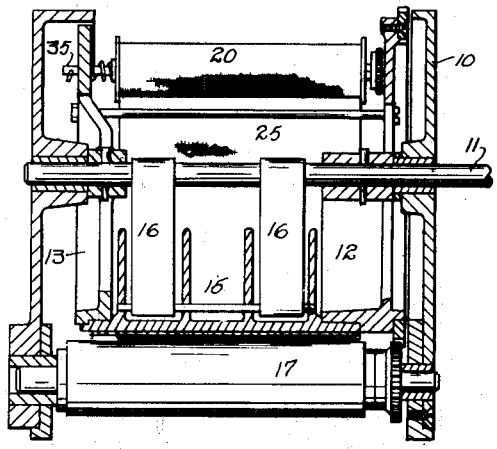
FIG_8
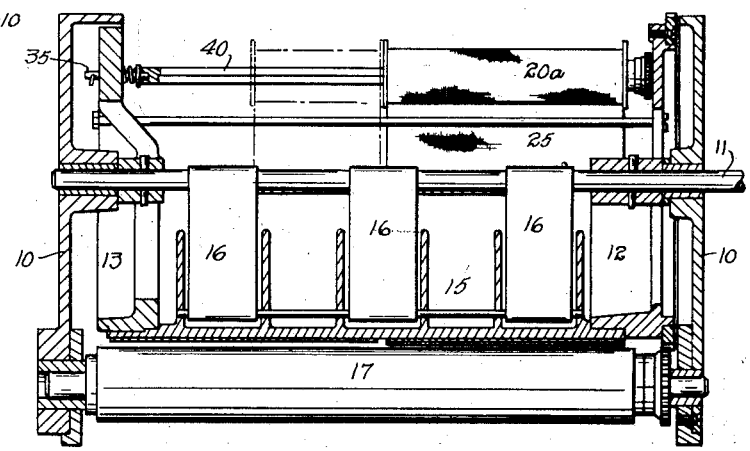
FIG_9   FIG_10
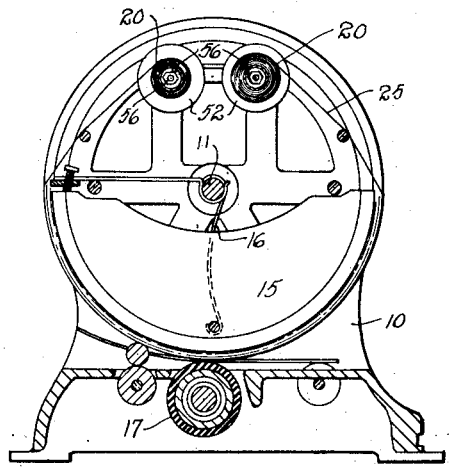
FIG_7
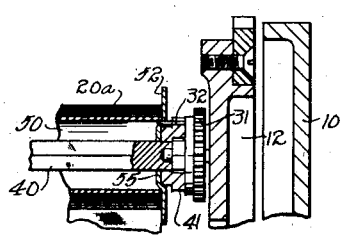
FIG_11
Inventor
Henry C. Osborn,
By Baker, Gobrick & Tear,
Attorneys Patented Nov. 8, 1932

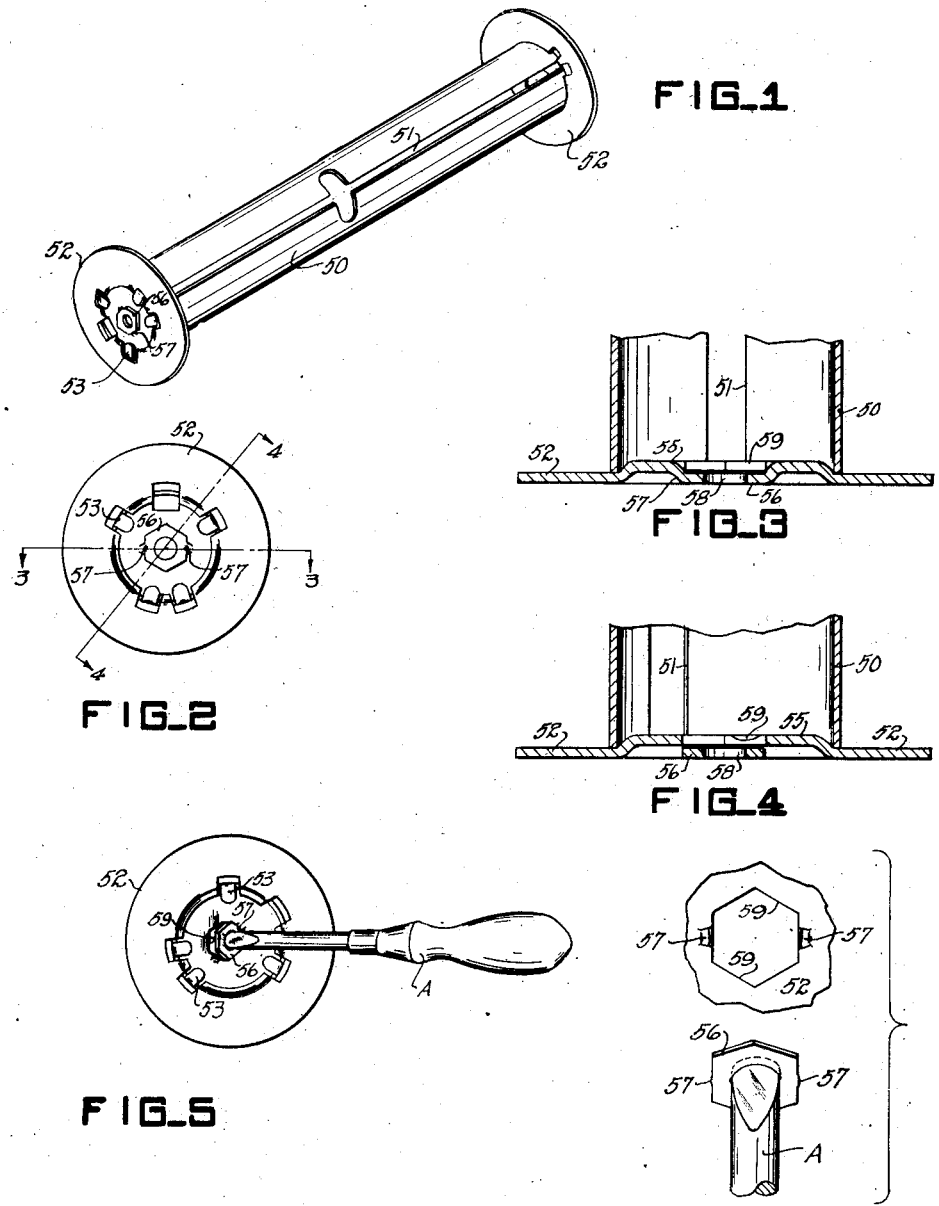

1,887,184

UNITED STATES PATENT OFFICE

HENRY C. OSBORN, OF CLEVELAND, OHIO, ASSIGNOR, BY MESNE ASSIGNMENTS, TO MULTIGRAPH COMPANY, OF WILMINGTON, DELAWARE, A CORPORATION OF DELAWARE

RIBBON SPOOL FOR PRINTING MACHINES

Application filed November 14, 1929. Serial No. 407,049.

This invention relates to spools suitable for carrying wound-up ribbons. Office printing machines having a rotary printing drum carrying a pair of spools for an inking ribbon are in extensive use under the name of the multigraph. In a standard multigraph the spools have round holes in their ends enabling them to be readily mounted on round pins carried by the drum. However in some special multigraphs the drum is materially wider than the length of the spool and the spool is slidably mounted on an angular driving rod, so that it may be adjustable in position or a plurality of spools carried in alignment. In this case, the spools have angular holes therein so that the rotation of the rod will rotate the spool.

It is the particular object of this invention to provide a spool adapted for mounting in the standard multigraph, but so arranged that it may be readily converted into a spool suitable for mounting on the angular rod of the special multigraph mentioned.

I accomplish the result by forming the spool ends with rudimentary angular holes normally closed by material carrying round holes. This enables a spool to be put on the market adapted for mounting in the standard multigraph, but, by simply removing the small piece of material carrying the round hole and exposing the angular hole, I can immediately adapt the spool for mounting in the machines having the angular rod feed.

The spools are preferably made of a sheet metal barrel and sheet metal heads stamped to shape. The angular rod of the wide multigraph on the market is hexagon shape in cross section. Accordingly, in making this new spool in an economical manner, I stamp onto the central region of the spool a recess having a hexagon exterior of a size corresponding to the hexagon rod mentioned, and I form a round hole through the displaced hexagon portion. This stamped hexagon portion is preferably entirely severed from the surrounding portion of the head except for two small narrow tongues connecting it with the remainder of the spool head, these tongues being diametrically opposite each other. This enables the head to be as economically stamped as the standard head, and the spool used in the identical manner of the standard spool, but whenever desired, a small screw driver or other tool may be inserted in the round hole and the part having the hexagon exterior pried loose from the rest of the head, thus converting the spool into one having hexagon holes in its ends.

My spool is clearly shown in the drawings hereof, as well as its manner of use both before and after alteration, and is hereinafter more fully described and its essential novel features are summarized in the claims.

In the drawings Fig. 1 is a perspective of my new spool; Fig. 2 is an end view thereof; Figs. 3 and 4 are enlarged fragmentary diagrammatic sections in planes indicated by the lines 3—3 and 4—4 on Fig. 2; Fig. 5 is an end elevation of the spool with a tool in the act of prying out the central region of the end; Fig. 6 is a view in the nature of a diagram illustrating the pried out portion and the hole left in the end of the spool; Fig. 7 is a vertical transverse section through a standard multigraph having the usual spools; Fig. 8 is a vertical longitudinal section of the same; Fig. 9 is an enlarged sectional view at the driving end of one of such spools; Fig. 10 is a longitudinal vertical section of one of the wide multigraphs having the hexagonal rod for carrying a plurality of spools or a variably positioned spool; Fig. 11 is a sectional view illustrating the spool drive of this type of multigraph.

As illustrated in Figs. 7 to 11 inclusive, 10 designates the end frame plates of a multigraph carrying a drive shaft 11 on which is mounted the end members 12 and 13 of a skeleton drum, this drum carrying a printing segment 15 which is clamped to the shaft by spring hooks 16. Parallel with the drum is a roller platen 17 with which the drum coacts. Mounted in the drum are ribbon spools 20 or 20a, on which the ends of an inking ribbon 25 are wound, this ribbon passing intermediately about the printing members on the drum so that the rotation of the drum in coaction with the platen may print on an intermediate sheet of paper.

In the standard multigraph, the end member 12 of the drum carries a central stud 30 on which is journalled a ratchet wheel 31 having a driving lug 32 to engage a recess in the spool end, the other end of the spool being carried by a round spring pressed stud 35 mounted in the end member 13 of the drum. Suitable means (not shown, but which may be in accordance with Patent No. 997,287, issued July 11th, 1911, to my assignee The American Multigraph Company) periodically rotates one ratchet wheel or the other to feed the ribbon step by step.

In Figs. 10 and 11, I have illustrated one of the extra wide multigraphs wherein the spools are mounted on hexagonal rods 40. This rod 40 has round holes in its ends to receive the studs 30 and 35 respectively, and has also at the driving end a collar 41 which has in it a notch engaged by the driving lug 32 of the ratchet drive. This construction is shown and claimed in the pending application No. 391,716 filed September 11th, 1929, by Lawrence H. Morse and assigned to my assignee The American Multigraph Company.

Now, my problem is to devise a simple ribbon spool suitable for mounting in the standard multigraph of Figs. 7, 8 and 9, but readily convertible for mounting on the hexagonal rod multigraph of Figs. 10 and 11. The spool by which I accomplish this is illustrated in Figs. 1 to 6 inclusive and will now be particularly described.

My spool has a sheet metal barrel 50, which may have a longitudinal slot 51 for the insertion of a head on the ribbon, and is provided at its ends with sheet metal heads 52. These heads are secured to the barrel by integral tongues 53 of the barrel which extend through holes 54 in the heads and are then bent over inwardly on the head as shown in Figs. 1 and 2. Each head 52 is dished or depressed in an intermediate circular region 55 for a distance about equal to the thickness of the metal, as shown in Figs. 3 and 4. In the central region of this dished portion 55 I press outwardly a hexagonal region 56. The amount of outward displacement of the hexagonal region is just about equal to the thickness of the metal and accordingly this hexagonal region for the greater part of its contour is just barely detached from the rest of the head, but it remains firmly connected therewith by two diametrically opposite tongues 57. The inward and outward displacements of the metal of the head compensate each other, so that the round hole is in the identical position of that in the former multigraph spools.

I find the new spool made as described, has ample strength for use in the standard multigraph and may remain as a round-hole spool throughout its life.

Now, when it is desired to mount one of these new spools on the hexagon-bar multigraph, it is only necessary to insert a suitable tool, as an awl or a small screw driver, into the central opening 58 of the hexagon portion and pry it slightly in the direction transverse of the diametric line connecting the tongues, such tool being illustrated at A in Figs. 5 and 6. This readily pries the hexagon region entirely free from the rest of the spool. In such operation a clear hexagon hole 59 is left in the head, the tongues breaking off slightly at the outside of the hexagonal contour, as illustrated in Fig. 6. When these hexagonal regions are broken out from the spool heads, it is in shape for mounting in the hexagonal rod 40 in the machine shown in Fig. 10.

I claim:—

1. A spool having an axial opening, said opening being carried by a readily displaceable portion of the spool head, the displacement of which leaves an available opening of different dimension.

2. A spool having a barrel and a head, the head provided with a rudimentary hole and with means integral with the head normally closing the hole and itself having a hole of different character from the contour of the rudimentary hole, whereby the removal of said means produces an effective hole of different character.

3. A spool having a sheet metal head, a central region of the head distorted from the plane of the surrounding material but connected with it by a readily frangible connection, and journalling means carried by said central region.

4. A spool having a head, a central region offset from the surrounding portion of the head, said central region having a hole through it and there being an incomplete hole in the head corresponding to the exterior of the offset region, said offset region being readily removable from the rest of the head to complete the last mentioned hole.

5. A spool having a sheet metal head, a stamped up central region of the head having an angular exterior and central hole journalling means, and readily frangible connections between the angular offset portion and the rest of the head.

6. A spool having a head, a central region distorted from the plane of the surrounding portion of the head but connected with the head by two diametrically opposite tongues there being a hole through the distorted region whereby such region may be removed and a larger hole left through the head.

7. A ribbon spool having a barrel, a sheet metal head connected to the end of the barrel, a central region having an angular exterior and a circular interior offset from the plane of the surrounding region of the head and still connected with it whereby the shape and size of the effective hole through the head may be varied by removing the offset region.

8. A spool having a head with a hexagonal recess therein, a portion of the head having its exterior corresponding to the recess offset from the plane of the surrounding portion of the head by a distance approximately equal to the thickness of the head, said offset region being connected to the head by two diametrically opposite tongues.

9. A spool having a barrel and a head, the head having a region depressed inwardly into the barrel and the depressed portion having a region depressed outwardly, said outwardly depressed portion having an opening whereby the spool may be mounted when the outwardly depressed portion is attached, the connection of the outwardly depressed portion with the rest of the head being of materially reduced strength whereby such outwardly depressed portion may be readily removed without disturbing the rest of the head and thereby leave an opening of different dimension in the end of the head.

10. A spool having a barrel and a sheet metal head, the head having a central region depressed inwardly into the barrel and the depressed portion having a smaller central region depressed outwardly for a distance substantially corresponding to the amount of the inward depression, said outwardly depressed portion having means whereby the spool may be mounted when the outwardly depressed portion is attached, the removal of the outwardly depressed portion leaving a mounting hole in the head.

11. A ribbon spool for a printing machine comprising a sheet metal barrel equipped with sheet metal heads at its opposite ends, each head having an inwardly depressed region to enter the barrel, the inwardly depressed region of each head being for a smaller area outwardly depressed to provide an offset region connected in a frangible manner with the rest of the head, said offset region being of angular form having its internal contour adapting the spool for mounting in one type of machine and its exterior contour being of such size and shape that the opening left in the head when the angular region is removed adapts the spool for a different type of mounting.

12. As a new article of manufacture, a spool having an axial opening carried by a fixed but readily removable part of the head, and means defining the external contour of such part so that its removal leaves a definite sized opening of different form from the original opening.

13. A spool having a barrel with sheet metal heads at its opposite ends, each head having a central hole and an incomplete line of severance extending about the region immediately surrounding the hole, said line having a different shape from the hole whereby the removal of the annular portion of the head between the hole and said line will leave an opening of larger size and different shape in the head.

14. A spool having a barrel and a head connected thereto, said spool being provided with a rudimentary axial hole and means normally preventing the completion of said hole and itself provided with a hole of different dimensions, said means being removable without disturbing the connection of the head to the barrel.

In testimony whereof, I hereunto affix my signature.

HENRY C. OSBORN.